US008751572B1

(12) United States Patent
Behforooz et al.

(10) Patent No.: US 8,751,572 B1
(45) Date of Patent: Jun. 10, 2014

(54) MULTI-USER CHAT SEARCH AND ACCESS TO CHAT ARCHIVE

(75) Inventors: Reza Behforooz, Seattle, WA (US); Qi Ke, Kirkland, WA (US); Deepak Menon, Redmond, WA (US); Justin Uberti, Kirkland, WA (US)

(73) Assignee: Google Inc., Mountain View, CA (US)

( * ) Notice: Subject to any disclaimer, the term of this patent is extended or adjusted under 35 U.S.C. 154(b) by 356 days.

(21) Appl. No.: 11/765,908

(22) Filed: Jun. 20, 2007

(51) Int. Cl.
    *G06F 15/16* (2006.01)
(52) U.S. Cl.
    USPC .......................................... 709/204; 709/206
(58) Field of Classification Search
    USPC ................................................ 709/204–207
    See application file for complete search history.

(56) References Cited

U.S. PATENT DOCUMENTS

| | | | |
|---|---|---|---|
| 2004/0054735 | A1 | 3/2004 | Daniell et al. |
| 2004/0199514 | A1 | 10/2004 | Rosenblatt et al. |
| 2005/0021624 | A1* | 1/2005 | Herf et al. ................ 709/204 |
| 2005/0030937 | A1 | 2/2005 | Wick et al. |
| 2005/0259638 | A1* | 11/2005 | Burg ........................... 370/352 |
| 2006/0069686 | A1* | 3/2006 | Beyda et al. ................. 707/10 |
| 2007/0198648 | A1* | 8/2007 | Allen et al. .................. 709/207 |
| 2008/0019353 | A1* | 1/2008 | Foote ............................ 370/352 |
| 2008/0034040 | A1* | 2/2008 | Wherry et al. ............... 709/204 |
| 2008/0228881 | A1* | 9/2008 | Reynolds et al. ............ 709/206 |
| 2010/0161903 | A1* | 6/2010 | Sato et al. .................... 711/118 |
| 2013/0145246 | A1* | 6/2013 | So .................................. 715/224 |

FOREIGN PATENT DOCUMENTS

WO 2007/095275 A2 2/2007

OTHER PUBLICATIONS

Saint-Andre, XEP-0045: Multi-User Chat, Sep. 13, 2006.*
Google, About Gmail, Feb. 18, 2007.*
Burd, XMPP Federation, Jan. 17, 2006.*
Conference Bot, Google Talk: Conference Bot, Apr. 2006, http://web.archive.org/web/20060414133034/http://coders.meta.net.nz/~perry/jabber/confbot.php.*
Google, Google Talk Chat History Saving, Feb. 3, 2007 http://web.archive.org/web/20070203050551/http://www.google.com/talk/chathistory.html.*
Saint-Andre, RFC 3920: Extensible Messaging and Presence Protocol (XMPP): Core, Oct. 2004.*
Cerulean, UI Design 001: Activity History, Reading the Past, Mar. 1, 2005, http://blog.trillian.im/?p=35.*
formessngers.com, MessengerLog series, Mar. 12, 2007, http://web.archive.org/web/20070312183336/http://www.formessengers.com/.*

(Continued)

*Primary Examiner* — Joseph Avellino
*Assistant Examiner* — James Conaway
(74) *Attorney, Agent, or Firm* — Leydig, Voit & Mayer, Ltd.

(57) ABSTRACT

In one embodiment, a computer network-based live chat having three or more participants is hosted. A record of the live chat is archived in a central location accessible by each participant. The archived record is provided to a requesting participant after completion of and/or during the live chat. The requesting participant may be, for example, any one of the three or more participants. The requesting participant may make the request from any remote location in communication with the central location. In another embodiment, a system for enabling access to a multi-user chat archive includes a multi-user instant messaging (IM) server, a state manager, an archive database, and an archive manager. The archive database is configured to store an archived record of the live chat in a central location. In this embodiment, the central location is accessible by each of the chat participants from any remote location in communication with the central location.

22 Claims, 15 Drawing Sheets

(56) References Cited

OTHER PUBLICATIONS

37signals, LLC.; "Business chat, file sharing, group decision making: Campfire"; 2007. Downloaded from http://www.campfirenow.com/ on Oct. 26, 2007; 3 pages.

37signals, LLC.; "Campfire Help and FAQs"; 2007. Downloaded from http://www.campfirenow.com/help on Oct. 26, 2007; 3 pages.

37signals, LLC.; "Example uses for Campfire"; 2007. Downloaded from http://www.campfirenow.com/examples on Oct. 26, 2007; 8 pages.

United States Patent and Trademark Office, Office Action Issued in U.S. Appl. No. 14/052,408 Mailed Dec. 6, 2013.

\* cited by examiner

MULTI-USER CHAT SEARCH AND ACCESS TO CHAT ARCHIVE

BACKGROUND

The present invention relates to web communication and archiving, particularly to web communication between three or more users.

The emergence and development of computer networks and protocols, including the World Wide Web (or simply "the web"), now allows many remote users to communicate with one another. Different types of communication tools have been developed for the web which allow users to communicate in different ways through a browser. One popular type of communication tool is instant messaging (also called chat). Instant messaging (IM) allows users to communicate over the web in real time. A user uses a client program (called an IM client) that communicates with an instant messaging service over the web. The IM client has a graphical user interface (GUI) that allows a user to input text and view text.

IM communication generally involves typing text. For example, two users chatting may type lines of text in each of their IM client programs. The instant messaging service passes the typed text between the IM clients. The lines of text may resemble a conversation in that successive lines of text are displayed in a temporal sequence along with an indication of the user who typed the text. Often this indication of the user is a display of the user's screen name (also called an IM address). A compilation of these messages exchanged between the users is commonly referred to as a chat. IM clients have historically had simple GUIs with rectangular window displays in which the text of a chat is made to scroll as the conversation proceeds.

Different IM services and IM client programs have different features relating to the chat experience. For example, IM services often provide presence information that indicates whether people on a user's list of contacts are currently online and available to chat. Some IM services also allow a user to set an "online status" or "away message" so that other users are aware of the user's availability to chat. Finally, users can often personalize their profiles to change graphical features associated with their chat. For instance, a user often has a screen name which is displayed to another to identify himself or herself when he or she is chatting. The screen name itself may be selected by the user (or assigned by the IM service). A user may also choose different font colors, font styles, symbols, or personalized images to be displayed along with his or her screen name. An example IM service includes the Google Talk service from Google, Inc. of Mountain View, Calif.

Many existing IM services are limited to communications between only two participants. In these systems, if a first user wishes to interact with more than one other user, the first user must open separate chats with each other user. This requires a user to switch between multiple windows and transfer text from one window to another if the user wants to share information with a user other than the user participating in the chat. Additionally, existing IM services provide only limited archiving capability, if any, and the archives are not easily accessible from multiple locations.

Users need a capability for interacting with more than one other participant in a chat. Such users also need a capability for accessing and searching through their previous chats.

SUMMARY

Embodiments of the present invention relate to enabling access to a multi-user chat archive. In one embodiment, a computer network-based live chat having three or more participants is hosted. A record of the live chat is archived in a central location accessible by each of the participants. The archived record is provided to a requesting participant after completion of and/or during the live chat. The requesting participant may be, for example, any one of the three or more participants. The requesting participant may make the request from any remote location in communication with the central location.

In another embodiment, a system for enabling access to a multi-user chat archive includes a multi-user instant messaging (IM) server, a state manager, an archive database, and an archive manager. The IM server is configured to receive a chat message from a first participant during a live chat and distribute the chat message to at least a second participant and a third participant during the live chat. The state manager is configured to identify the first, second, and third live chat participants. The archive database is configured to store an archived record of the live chat in a central location. The archive manager is configured to send the archived record to the archive database for storage and retrieve the archived record from the archive database upon request from a participant of the live chat. In this embodiment, the central location is accessible by each of the chat participants from any remote location in communication with the central location.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The terms "instant messaging" (IM) and "chat" are used interchangeably herein to refer broadly and inclusively to any instant messaging application, protocol, framework or service as would be apparent to a person skilled in the art given this description. An example IM service (including an IM server and/or IM client) which may be adapted to incorporate embodiments of the present invention as described herein includes, but is not limited to, the Google Talk service from Google, Inc. of Mountain View, Calif.

Figure 1:
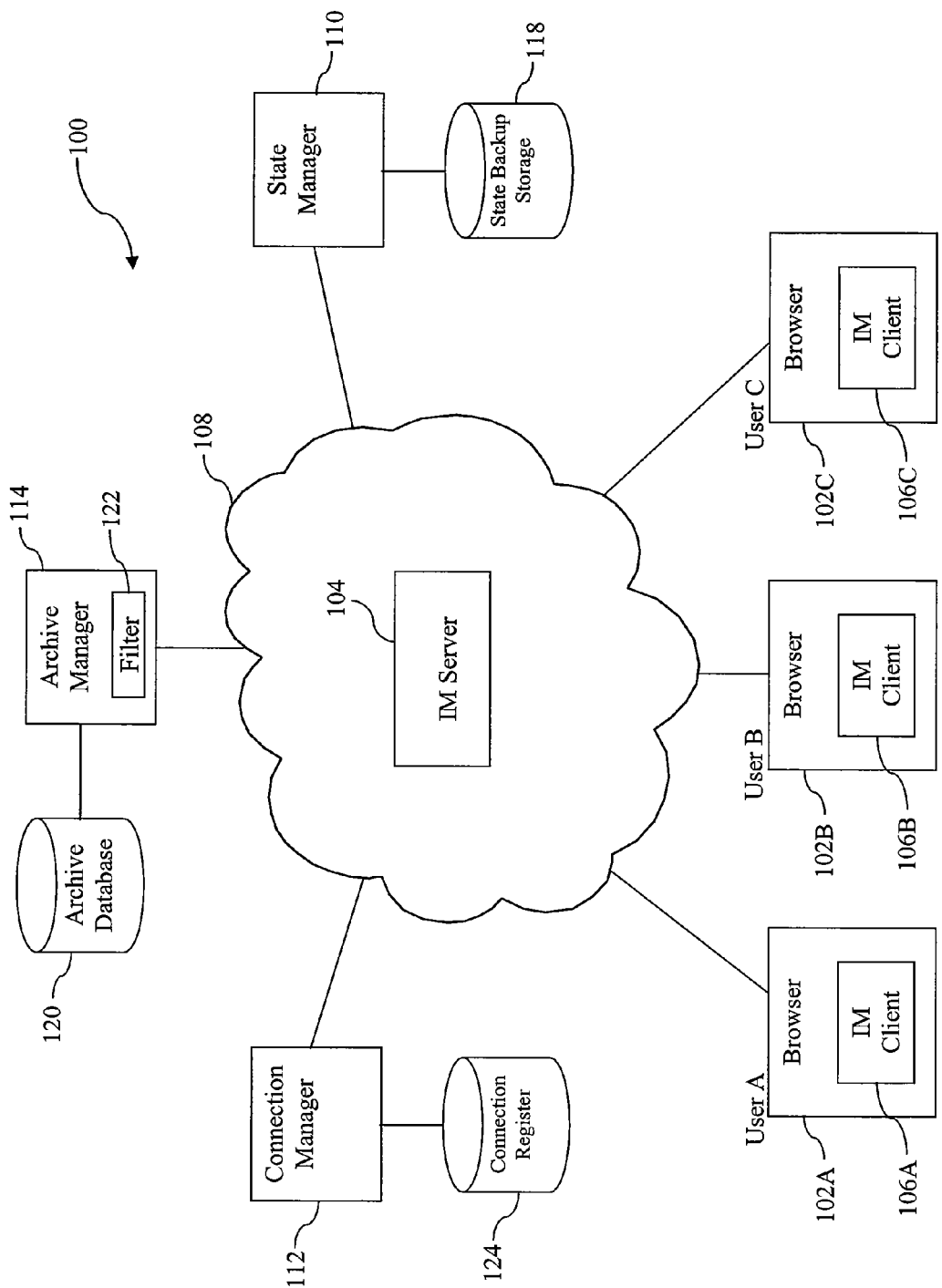
FIG. 1 is a diagram of an exemplary system for providing instant messaging (IM) capabilities between three or more users according to an embodiment of the present invention.

FIG. 1 is a diagram of a system 100 for providing IM capabilities between three users A, B, and C according to an embodiment of the present invention. Although system 100 is described herein with reference to three users, one of skill in the art will recognize that system 100 may also be utilized in providing IM capabilities between more than three users or less than three users without departing from the spirit and scope of the present invention. System 100 includes a browser 102A coupled to a central IM server 104 over one or more networks 108. Browser 102A includes an IM client 106A associated with user A. System 100 also includes a browser 102B coupled to IM server 104. Browser 102B includes an IM client 106B associated with user B. System 100 further includes a browser 102C coupled to IM server 104. Browser 102C includes an IM client 106C associated with user C.

Central IM server 104 may utilize various other networked components to support communication between users A, B, and C. As will be described in further detail below, IM server 104 may be coupled to a state manager 110, a connection manager 112, and an archive manager 114. State manager 110 may in turn be coupled to a state backup storage 118. Archive manager 114 may be coupled to an archive database 120. Connection manager 112 may be coupled to an IM connection register 124. Each of these couplings may exist as a direct connection or may exist as an indirect connection through network 108.

Network 108 can be any network or combination of networks that can carry data communication, and may be referred to herein as a computer network. Such network 108 can include, but is not limited to, a local area network, medium area network, and/or wide area network such as the Internet. Network 108 can support protocols and technology including, but not limited to, World Wide Web protocols and/or services. Intermediate web servers, gateways, or other servers may be provided between components of system 100 depending upon a particular application or environment.

Client browsers 102A, 102B, 102C and IM clients 106A, 106B, 106C can be implemented in software, firmware, hardware, or any combination thereof. Client browsers 102A, 102B, 102C and IM clients 106A, 106B, 106C can be implemented to run on any type of processing device including, but not limited to, a computer, workstation, distributed computing system, embedded system, stand-alone electronic device, networked device, mobile device, set-top box, television, or other type of processor or computer system. Such a processing device implementing a client browser and/or an IM client may be referred to herein as a remote client device. Client browsers 102A, 102B, 102C and IM clients 106A, 106B, 106C can also be used in a variety of applications in combination with instant messaging, or in instant messaging alone.

Similarly, IM server 104, state manager 110, connection manager 112, and archive manager 114 can be implemented in software, firmware, hardware, or any combination thereof. IM server 104, state manager 110, connection manager 112, and archive manager 114 can be implemented to run on any type of processing device including, but not limited to, a computer, workstation, distributed computing system, embedded system, stand-alone electronic device, networked device, mobile device, set-top box, television, or other type of processor or computer system. IM server 104, state manager 110, connection manager 112, and archive manager 114 can also be used in a variety of applications in combination with instant messaging, or in instant messaging alone.

System 100 can be used as a stand-alone system or in connection with a search engine, web portal, or other web site to allow three or more remote users to engage in instant messaging. IM server 104, state manager 110, connection manager 112, and archive manager 114 can operate alone or in tandem with other servers, web servers, or devices and can be part of any search engine, portal, or web site.

Functionality described herein is described with respect to components or modules for clarity. However, this is not intended to be limiting, as functionality can be implemented on one or more modules on one device or distributed across multiple devices.

In operation, IM server 104 manages the overall communication between IM clients 106A, 106B, 106C. When users A, B, C begin chatting, IM clients 106A, 106B, 106C each provide a user interface that includes a conversation window for users A, B, C to input their respective chat message. Optional presence information may also be made available so that users A, B, C know if they are available to chat, or if others are available to chat.

In a three-person chat, for example, a first IM participant, such as user A, inputs a chat message to IM client 106A. IM client 106A sends the chat message through browser 102A to IM server 104. Upon receipt of the chat message and appropriate data from other components of system 100, as will be described below, IM server 104 transmits the chat message through browsers 102B, 102C to IM clients 106B, 106C for receipt by users B, C. Such communication between users is significantly different for IM systems having three or more users compared to IM systems that allow communication between only two users.

Figure 2:
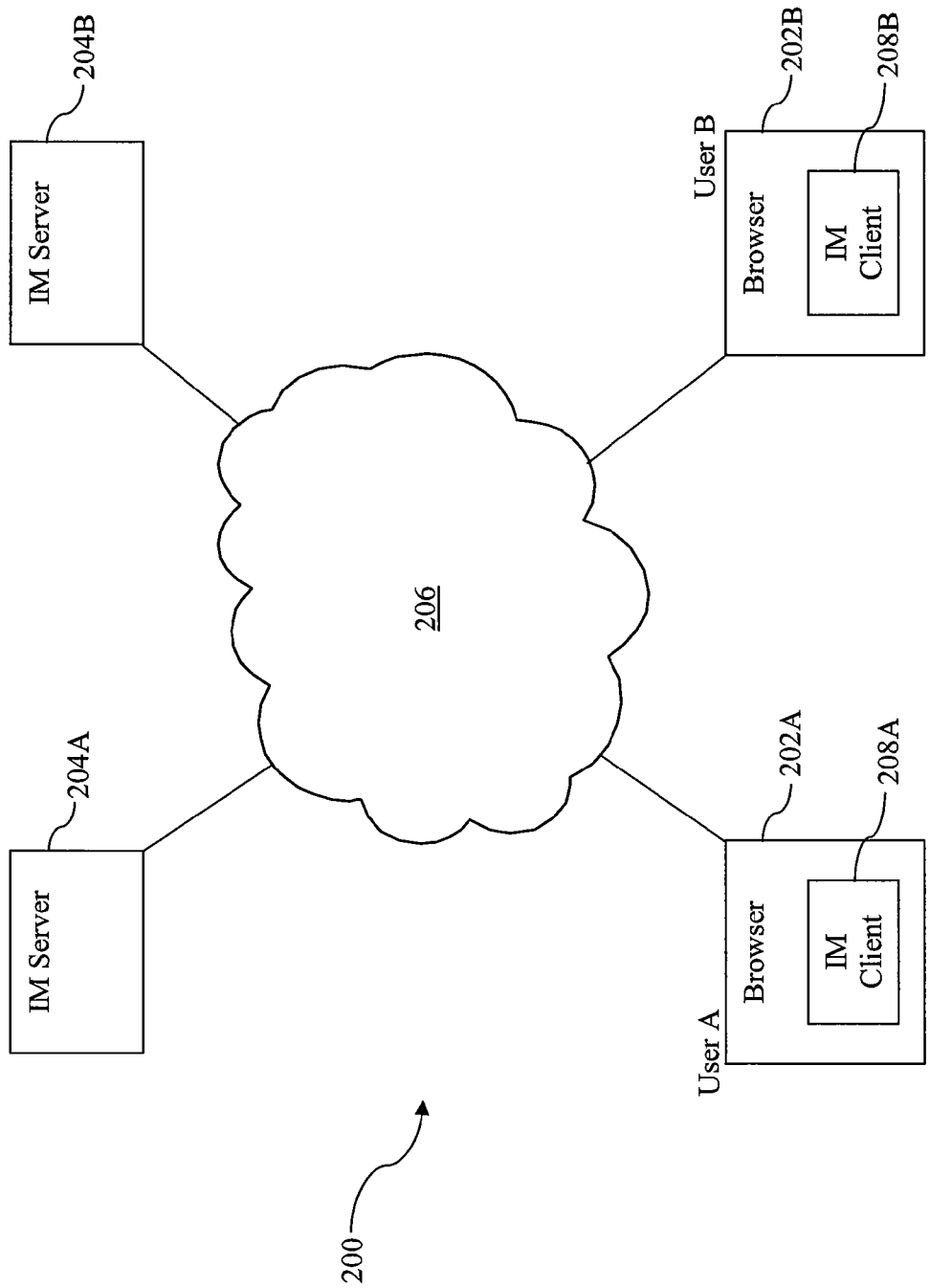
FIG. 2 is a diagram of an example two-user IM system.

FIG. 2 is a diagram of a typical two-user IM system 200. System 200 includes a browser 202A coupled to an IM server 204A over a network 206. Browser 202A further includes an IM client 208A associated with a user A. A browser 202B is also coupled to an IM server 202B over network 206. Browser 202B further includes an IM client 208B associated with a user B. IM server 204A is further coupled to IM server 204B over network 206.

In operation, IM server 204A manages instant messaging with IM client 208A. IM server 204B manages instant messaging with IM client 208B. As the users chat, IM clients 208A, 208B pass chat messages to respective IM servers 204A, 204B. The chat messages are forwarded between IM servers 204A, 204B, and from there, forwarded to respective IM clients 208A, 208B. These type of two-user IM systems tend to be stateless, in that two users are signed into an IM network and send messages back and forth to each other using a dynamic chat connection. IM clients 208A, 208B typically incorporate an addressing scheme into a sent message to route the message to the intended recipient. The connection between IM servers 204A, 204B does not need to be persistent, as long as a pathway exists between the two users. In the event that a server between the two users fails (such as, for example, IM server 204A or IM server 204B), the chat connection can be rerouted through a different server using the addressing scheme.

IM systems allowing three or more users are not so simple. When one user sends a chat message, the message is not automatically addressed to a participant on the other end of the IM connection. Instead, state information may be required to keep track of which users are participating in the conversation, which users are allowed to participate in the conversation, the order of messages input by users, etc. Keeping this state information may require a dedicated resource on the IM network. In an embodiment, keeping the state information also may require that the state information be backed up in the event that a server fails, so that the chat can continue uninterrupted without losing chat participant details.

Accordingly, in system 100 of FIG. 1, IM server 104 is coupled to state manager 110. State manager 110 maintains, for example and without limitation, a record of the number of chat participants, the identities of chat participants, and the order of messages input by chat participants. State manager 110 may transfer state information to state backup storage 118 for later retrieval. State backup storage 118 may be accessible by any number of systems 200, so that the chat between the participants may be rerouted while state information is maintained, if a component of system 200 fails. Although state backup storage 118 is illustrated in FIG. 1 as being in direct communication with state manager 110, one of skill in the art will recognize that state manager 110 may also communicate with state backup storage 118 via network 108.

IM server 104 is also coupled to connection manager 112. Connection manager 112 maintains connection information associated with the chat participants and IM server 104. Connection information may include, for example and without limitation, a location and/or network address. Connection manager 112 may further maintain connection information between client servers 106A, 106B, 106C associated with the chat participants and IM server 104. Connection manager 112 may maintain connection information using, for example, an IM connection register 124. Connection manager 112 has the capability to add users to or remove users from a live chat upon instruction from IM server 104. In one embodiment, connection manager 112 is part of IM server 104. In another embodiment, connection manager 112 is a standalone module. Although IM connection register 124 is illustrated in FIG. 1 as being in direct communication with connection manager 112, one of skill in the art will recognize that connection manager 112 may also communicate with IM connection register 124 via network 108.

Some existing IM systems have an archiving capability that records a transcript of a chat on the user's remote client device. For example, the transcript may be recorded on a hard drive of the user's personal computer. Such a transcript is accessible only to a user having access to that remote device. If the user changes devices, the user can no longer access the transcript. Additionally, the transcript stored by these systems primarily includes only the text components of the chat, but not multimedia components of the chat.

In an embodiment of the present invention, to allow a user to access a chat in which the user previously participated, chat records are archived by archive manager 114 in archive database 120. Archive database 120 is centrally located, and is accessible from any remote location through network 108. Although archive database 120 is illustrated in FIG. 1 as being in direct communication with archive manager 114, one of skill in the art will recognize that archive manager 114 may also communicate with archive database 120 via network 108.

In one embodiment, as messages are passed between users A, B, C in a live chat, archive manager 114 associates the messages with a live chat identifier and stores them as a record in archive database 120 under the associated live chat identifier. In another embodiment, archive manager 114 stores the entire chat as a record in archive database 120 under a live chat identifier once the live chat is complete. In addition to any text component of a live chat, archive manager 114 stores one or more multimedia components of the live chat. A multimedia component may include, for example and without limitation, a video component of the live chat (e.g., wherein video from the participants is broadcast as part of the live chat), an audio component of the live chat (e.g., wherein audio from the participants is broadcast as part of the live chat), a URL associated with the live chat, and/or a file transferred through the live chat. Storage of both text components and multimedia components of a chat at a central location ensure that all components of the chat can be easily accessed by any chat participant once the participant has exited the chat. In addition to the live chat identifier, archive manager 114 may also associate each archived record with one or more participant identifiers, so that only those users who participated in the original chat are able to access the archived record at a later date. The participant identifier may include, for example, the username and/or identity of each participant in the original chat. In one embodiment, archive manager 114 indexes the archived record by, for example and without limitation, a participant of the live chat, a date of the live chat, a keyword, and/or a multimedia component of the chat.

Archive manager 114 may include a filter 122 that allows a user to search through chats stored in archive database 120. Filter 122 may receive a search term input by a user, identify one or more archived records corresponding to the search term, and return the one or more identified archived records to the user. If the archived records are associated with a participant identifier, filter 122 may identify only those archived records corresponding to the search terms that also have a participant identifier matching an identifier of the requesting user. This search functionality will be further described below.

Figure 3:
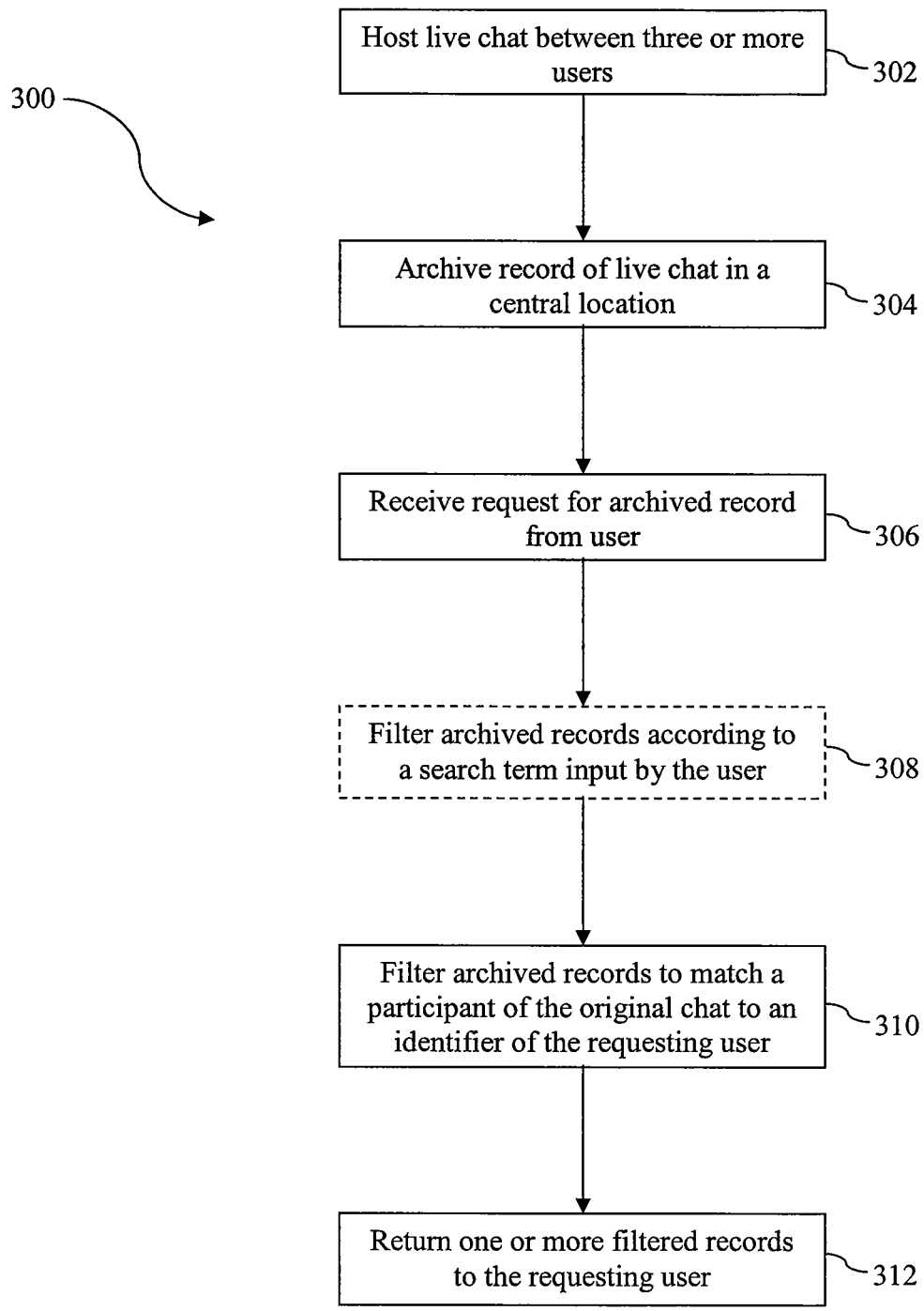
FIG. 3 is a flowchart of an exemplary routine for archiving messages according to an embodiment of the present invention.
Figure 4:
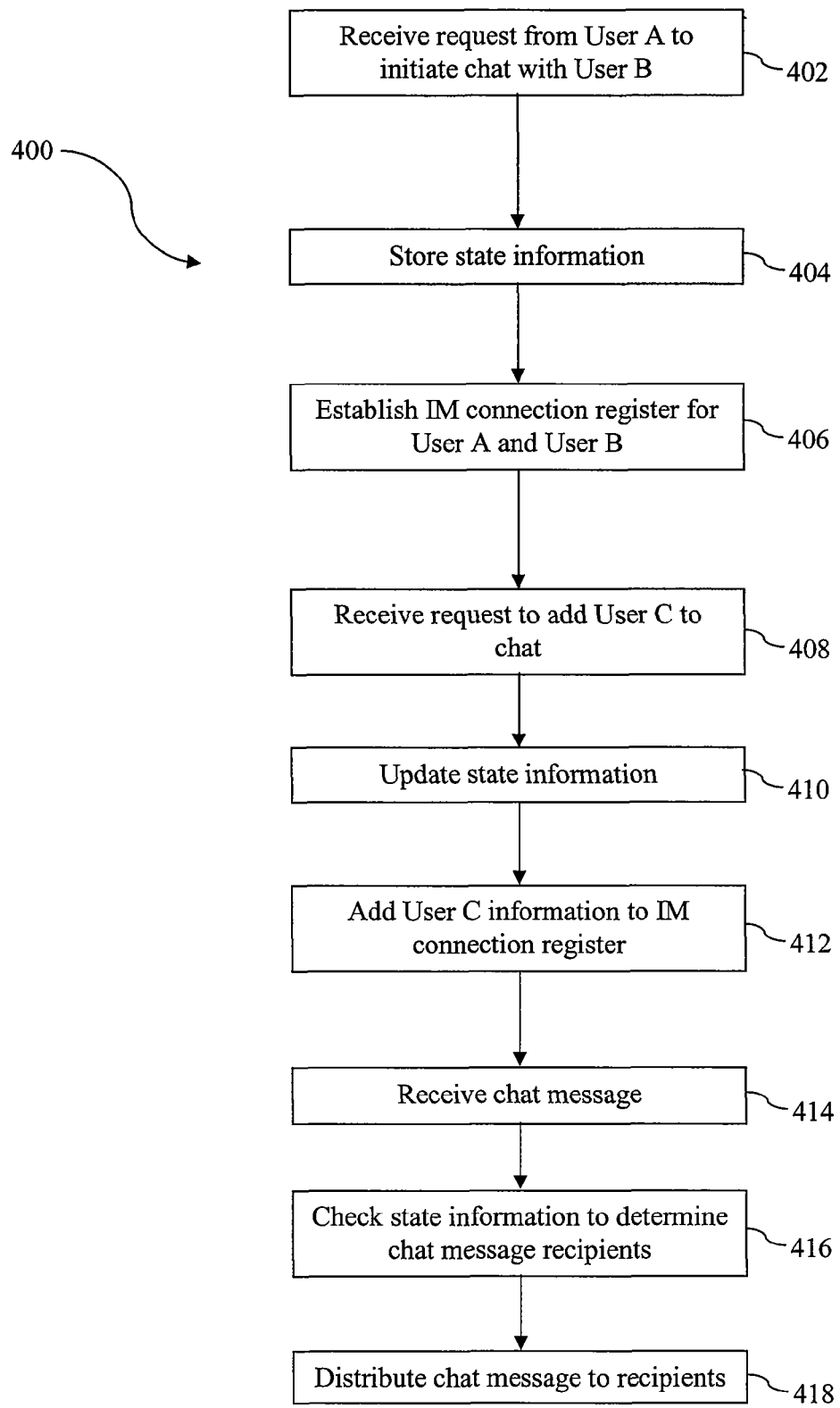
FIG. 4 is a flowchart of an exemplary routine for hosting a live chat according to an embodiment of the present invention.
Figure 5:
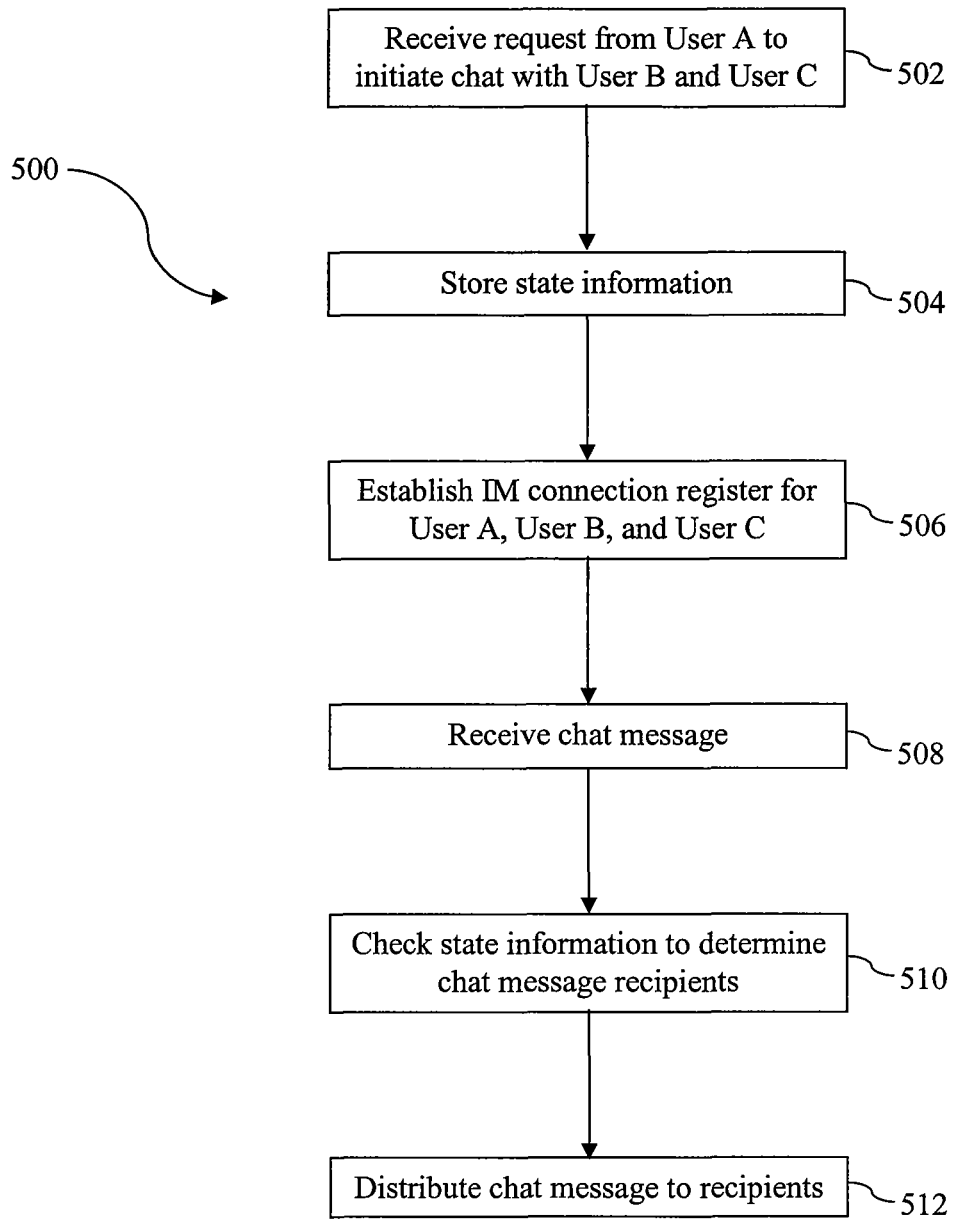
FIG. 5 is a flowchart of another exemplary routine for hosting a live chat according to an embodiment of the present invention.

Embodiments and the operation of system 100 are further described with respect to routines 300, 400 and 500 in FIGS. 3, 4 and 5. Routines 300, 400 and 500 will be described with reference to system 100 but are not necessarily limited to the structure of system 100.

FIG. 3 illustrates an exemplary routine 300 for archiving messages in a central location for later access according to an embodiment of the present invention. In step 302, a live chat is hosted between three or more users. The live chat may be hosted by, for example, IM server 104. Hosting of a live chat may occur in various ways.

FIG. 4 illustrates a routine 400 for hosting a live chat having three or more participants according to an embodiment of the present invention. In step 402, a request is received from a first participant, referred to herein as User A, to initiate a live chat with a second participant, referred to herein as User B. The request may be received by, for example, IM server 104.

In step 404, state information corresponding to the chat between User A and User B is determined and stored. The state information may be stored, for example, by state manager 110 in state backup storage 118. As discussed above, state information may include, for example and without limitation, the identity of users invited to the chat, the identity of users participating in the chat, the number of chat participants, and the order in which chat messages are received.

In step 406, an IM connection register is established for connections between User A and User B. In an embodiment, the IM connection register is established to track respective network addresses used by User A and User B. The network addresses may be, for example, network addresses of IM clients 106A, 106B in system 100. The IM connection register may be established by, for example, information from connection manager 112 as connection register 124.

In one example implementation of step 406, IM server 104 retrieves participant identifiers for User A and User B from state manager 110. IM server 104 forwards the participant identifiers to connection manager 112. Connection manager 112 determines a location, such as a network address, for each of User A and User B using, for example, IM connection register 124. Connection manager 112 provides the location for each of User A and User B to IM server 104, which uses the location information to establish an IM connection and pass messages between User A and User B.

Transmitting messages between users in this manner is different from a typical chat room, in which a dedicated resource is always available, even when there is no or only one participant in the chat. Typical chat rooms provide the ability for a user to enter an open chat room and wait for other users to join. Users of a typical chat room also cannot send a request through the chat room for other users to join the chat room. Dedicated chat rooms also carry the danger of abuse, because there is no need for users of a chat room to be acquainted prior interaction in the chat room. In comparison, the IM connection discussed herein requires that each additional participant be specifically invited to the chat by the first participant. Typically, there will be some identity awareness between the participants, since a first user often has to request the permission of a second user to either include the second user on their IM contact list or to send the second user a chat message.

In step 408, a request is received to add a third participant, referred to herein as User C, to the existing live chat between User A and User B. In one embodiment, the request to add User C may be made by either User A or User B. In an alternative embodiment, the request to add User C may require approval from all participants of the chat. The request may be received by, for example, IM server 104.

In step 410, the state information corresponding to the live chat is updated to include state information for User C. In the example of FIG. 1, the state information may be updated by state manager 110 and stored in state backup storage 118.

In step 412, connection information associated with User C is added to existing IM connection register 124.

In step 414, a chat message input by one of the chat participants is received. The chat message may be received by, for example, IM server 104. For purposes of this example, the chat message is received from User A.

In step 416, state information associated with the live chat is consulted to determine the participants of the live chat. For example, IM server 104 may request state information from state manager 110 to identify User A, User B, and User C as participants in the live chat. Since User A sent the original chat message, IM server 104 can determine that all identified users other than User A should receive the chat message.

In step 418, the chat message is distributed to the remaining participants of the live chat. In the example above, since User A is the sender of the original chat message, IM server 104 transmits the chat message to User B and User C.

FIG. 5 is a routine 500 for hosting a live chat having three or more participants according to another embodiment of the present invention. In routine 400, a chat is first established between two users with a third user being added at a later time. In routine 500, however, the chat is initially established between all three users.

In step 502, a request is received from a first participant, referred to herein as User A, to initiate a live chat with a second participant, referred to herein as User B, and a third participant, referred to herein as User C. The request may be received by, for example, IM server 104.

In step 504, state information corresponding to the chat between User A, User B, and User C is determined and stored. The state information may be stored, for example, by state manager 110 in state backup storage 118. As discussed above, state information may include, for example and without limitation, the identity of users invited to the chat, the identity of users participating in the chat, the number of chat participants, and the order in which chat messages are received.

In step 506, an IM connection register is established using connection information associated with User A, User B, and User C. In an embodiment, the IM connection register may be created using respective network addresses for User A, User B, and User C. The network addresses may be, for example the network addresses of IM clients 106A, 106B, 106C in system 100. The IM connection register may be established by, for example, connection manager 112, as described with respect to step 406 in FIG. 4.

In step 508, a chat message input by one of the chat participants is received. The chat message may be received by, for example, IM server 104. For purposes of this example, the chat message is received from User A.

In step 510, state information associated with the live chat is consulted to determine the participants of the live chat. For example, IM server 104 may request state information from state manager 110 to identify User A, User B, and User C as participants in the live chat. Since User A sent the original chat message, IM server 104 can determine that all identified users other than User A should receive the chat message.

In step 512, the chat message is distributed to the remaining participants of the live chat. In the example above, since User A is the sender of the original chat message, IM server 104 transmits the chat message to User B and User C.

FIGS. 4 and 5 thereby illustrate example routines for hosting a live chat between three or more users in accordance with step 302 of FIG. 3. Returning to FIG. 3, routine 300 proceeds to step 304.

In step 304, a record of the live chat is archived in a central location that is accessible by any of the participants of the chat. In system 100 of FIG. 1, archive manager 114 stores the chat in archive database 120. Archive manager 114 may assign the archived record a live chat identifier. The archiving may occur on a per-message basis (that is, every time a chat message is received and/or transmitted within the chat). Alternatively, the archiving may occur after the live chat is complete. The record of the live chat stored in step 304 includes not only a text component of the live chat, but may also include one or more multimedia components. A multimedia component may include, for example and without limitation, a video component of the live chat, an audio component of the live chat, a URL associated with the live chat, and/or a file transferred through the live chat.

In step 306, a request for an archived record is received from a user. As will be described in further detail below, the request may be received when the user selects a link within a separate live chat window. Alternatively, the request may be received when the user selects a link within a network-based electronic mail user interface. As will be recognized by one of skill in the art, other modes of requesting an archived record by a user can be exercised without departing from the spirit and scope of the present invention. Such a request may be received by, for example, IM server 104 which then passes the information to archive manager 114.

Step 308 is an optional step. In step 308, archived records are filtered according to a search term input by the user. The search term may be one or more of, for example and without limitation, a name of a participant of the live chat, a date of the live chat, or a keyword. The search capability allows a user, among other things, to revisit chats with one or more specific participants, chats held on a specific date provided by the user, and/or chats related to a specific subject matter (as determined by the keyword input by the user). In the example of system 100, one or more search terms may be received by IM server 104. IM server 104 transmits the received search term(s) to filter 122 in archive manager 114. Filter 122 accesses archive database 120 and identifies one or more archived records in archive database 120 that correspond to the search term(s). The identified archived record(s) are then returned to IM server 104 by archive manager 114 and transmitted to the requesting user by IM server 104. The search term may be sent by the user, for example and without limitation, through a text box in a live chat window or through a text box in a network-based electronic mail user interface.

In step 310, the archived records are filtered so that only chats in which the requesting user was a participant are returned to the requesting user. One of skill in the art will recognize that step 310 may occur before or after step 308. In an exemplary embodiment, an identifier of the requesting user (e.g., a username) is compared to an identifier associated with a corresponding archived record (e.g., a participant identifier). If the identifiers match, then the archived record may be returned to the requesting user. If the identifiers do not match, then the archived record may not be returned to the requesting user. In system 100, step 310 may be performed by, for example, filter 122 in archive manager 114.

In step 312, one or more filtered archived records are returned to the requesting user. The archived records may be returned in a list format, allowing the requesting user to select a specific archived record for full display with all associated text and multimedia components. Alternatively, the archived records may be returned in full format with all associated text and multimedia components.

If a user is discussing information in a chat that is, for example, private, sensitive, and/or confidential, the user may not want a record of the live chat stored in a centrally accessible location. In this instance, the user may request that the live chat not be archived. The request may be implemented only for a single chat session, or it may be implemented for multiple chat sessions of the requesting user. Once the user has requested not to archive the live chat, archive manager 114 ceases recordation of the live chat.

Conversation Window Example

Figure 6:
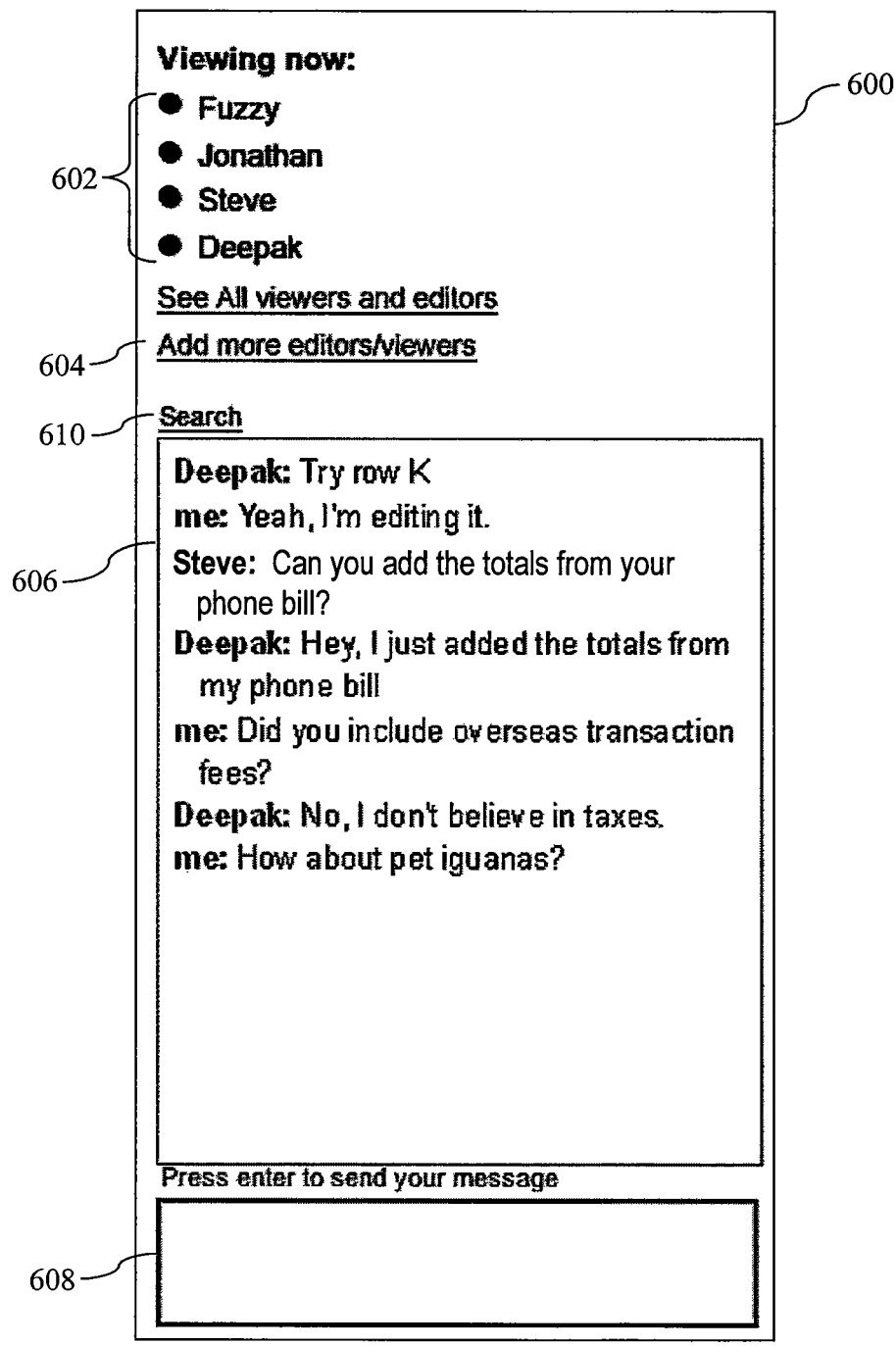
FIG. 6 is an illustration of an exemplary live chat window according to an embodiment of the present invention.

FIG. 6 is an illustration of an example live chat window 600. This window, as well as other windows illustrated herein, is illustrative and not intended to limit the present invention to this specific example or its features. Live chat window 600 may include a participant indicator field 602, an invite participants link 604, a message window 606, an input message field 608, and a search link 610. Participant indicator field 602 may display the display name and current presence for one or more participants of the chat. Invite participants link 604 may be used to open a list of contacts from which participants can be selected to invite to join the chat. Message window 606 is an area in which chat content from three or more participants can be displayed. Input message field 608 is an area in which a chat message can be entered by a user. Search link 610 allows a user to open a search window for searching archives of previous live chats. As used herein, the term "link" refers to any kind of link, button, selector, or other type of user interface control element for connecting to an application and/or executing an action from a given location.

Message windows (such as window 606) may also support different modes such as in-page, in-line, or popout. In-page may have the message window as part of the web page flow with fixed width and height. An in-line mode may have a chat window inline within a browser window, but separate from a chat contact list, appear when a cursor is near an area. A pop-out message window may be a message window that lives in its own browser chrome.

Other instant messaging functionality such as inputting emoticons and playing sounds may be provided in message windows. A message window in conjunction with a window manager may decide whether or not to play sounds on receipt of new messages.

Figure 7:
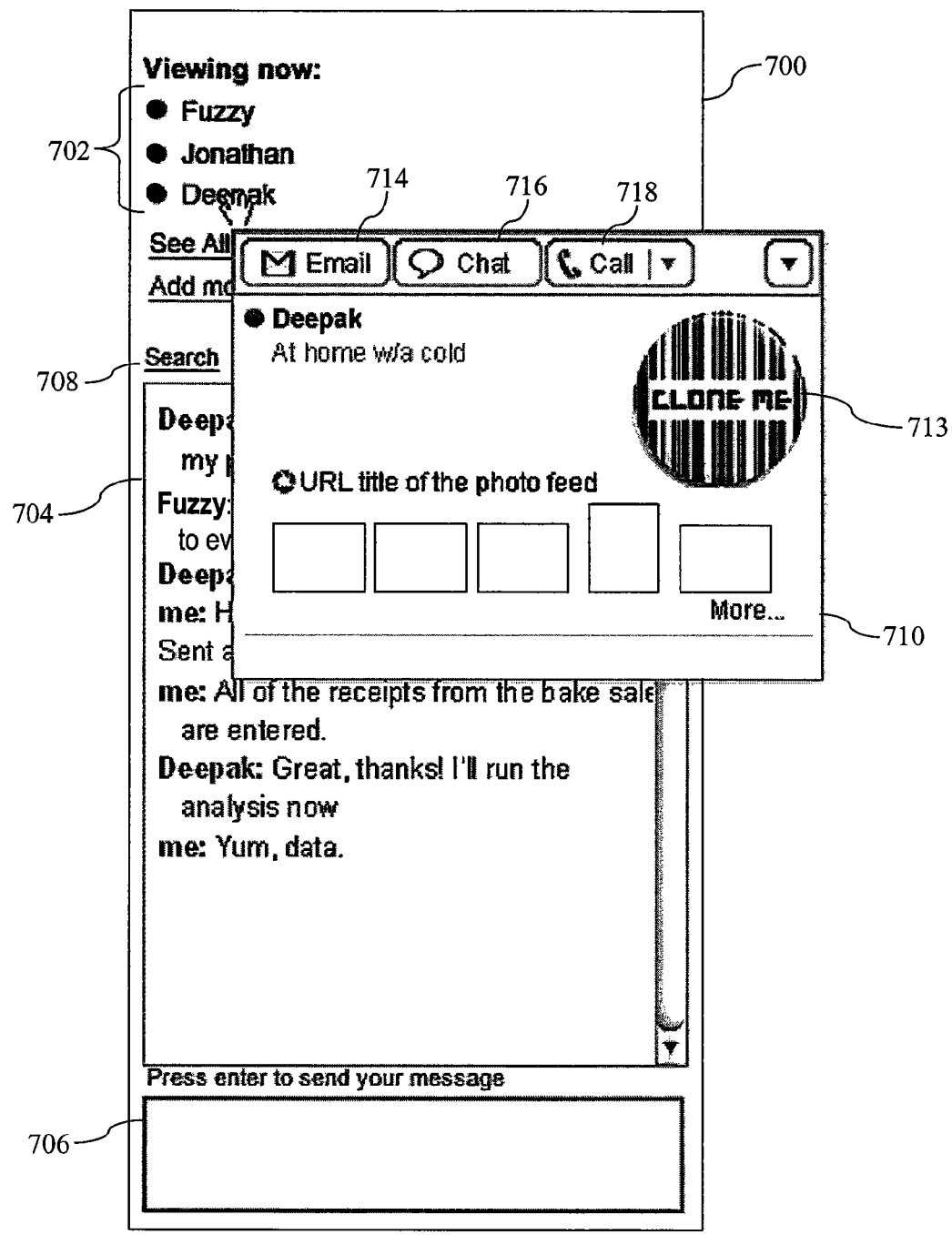
FIG. 7 is an illustration of another exemplary live chat window according to an embodiment of the present invention.

FIG. 7 is an illustration of an example live chat window 700. Live chat window 700 includes a participant indicator field 702, a message window 704, an input message field 706, and a search link 708. Live chat window 700 also includes the capability of opening a sidebar conversation between two participants in the live chat. In an embodiment, when a first chat participant clicks on and/or hovers over the display name for a second chat participant in participant indicator field 702, a sidebar window 710 opens. The sidebar window allows the first chat participant to interact directly with the second chat participant outside of the live chat, which has other participants. Sidebar 710 includes functions typically available to users of two-user chat systems. For example, sidebar 710 allows the first user to see presence information 712 and/or avatar 713 corresponding to the second user. Additionally, sidebar 710 allows the first user to open a draft email to the second participant via email link 714, open a new two-user chat between the first and second users via chat link 716, initiate a computer network-based telephone call (e.g., using VoIP protocol) via call link 718, and various other capabilities as would be evident to one of skill in the art.

Figure 8:
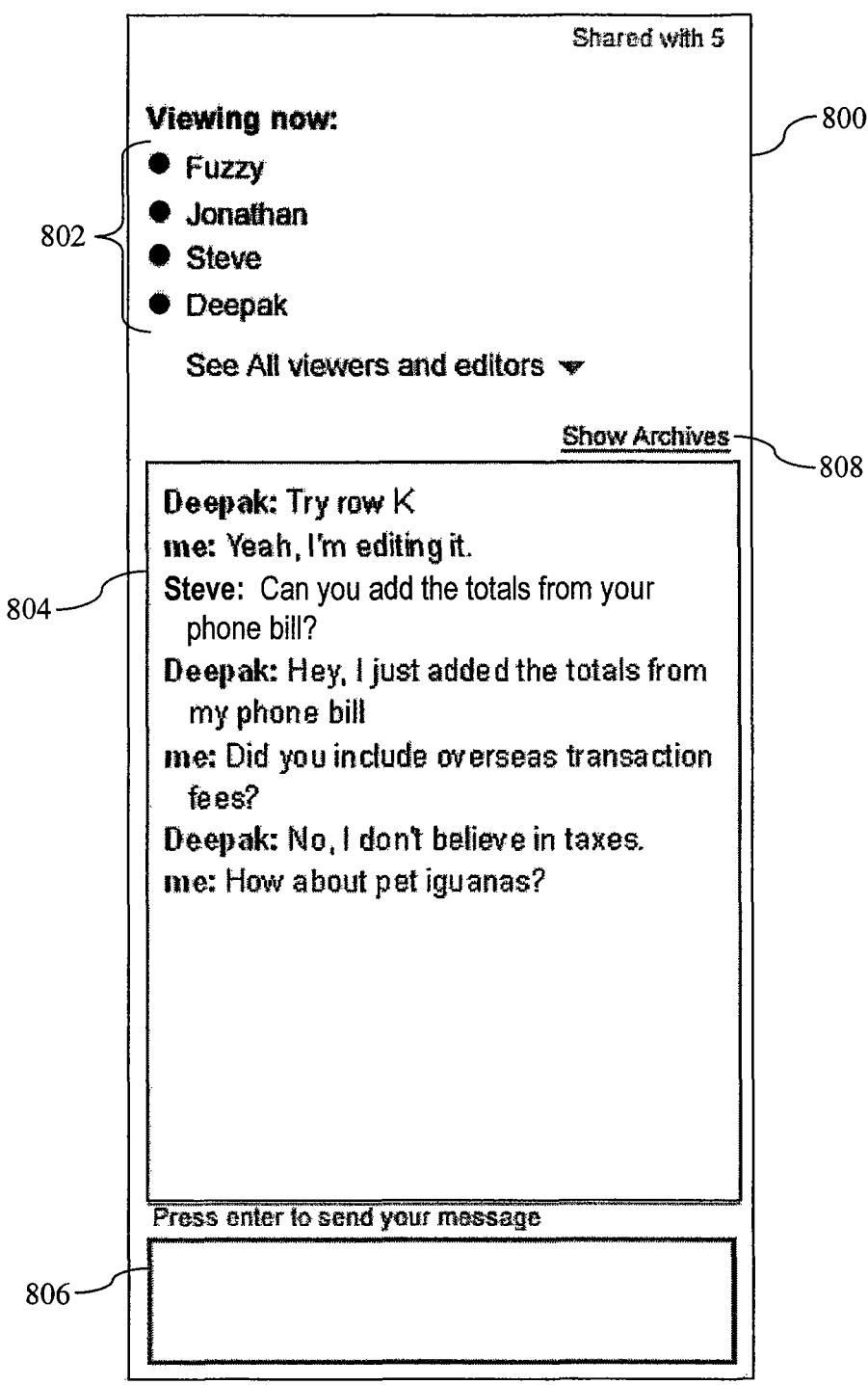
FIG. 8 is an illustration of yet another exemplary live chat window according to an embodiment of the present invention.

FIG. 8 is an illustration of an example live chat window 800. In addition to a participant indicator field 802, a message window 804, and an input message field 806, live chat window 800 includes an archives link 808. When a user wants to view an archived record of a previous chat, the user can select archives link 808. Selection of archives link 808 may result in a display by, for example, archive manager 114 of archived records stored in, for example, archive database 120.

Figure 9:
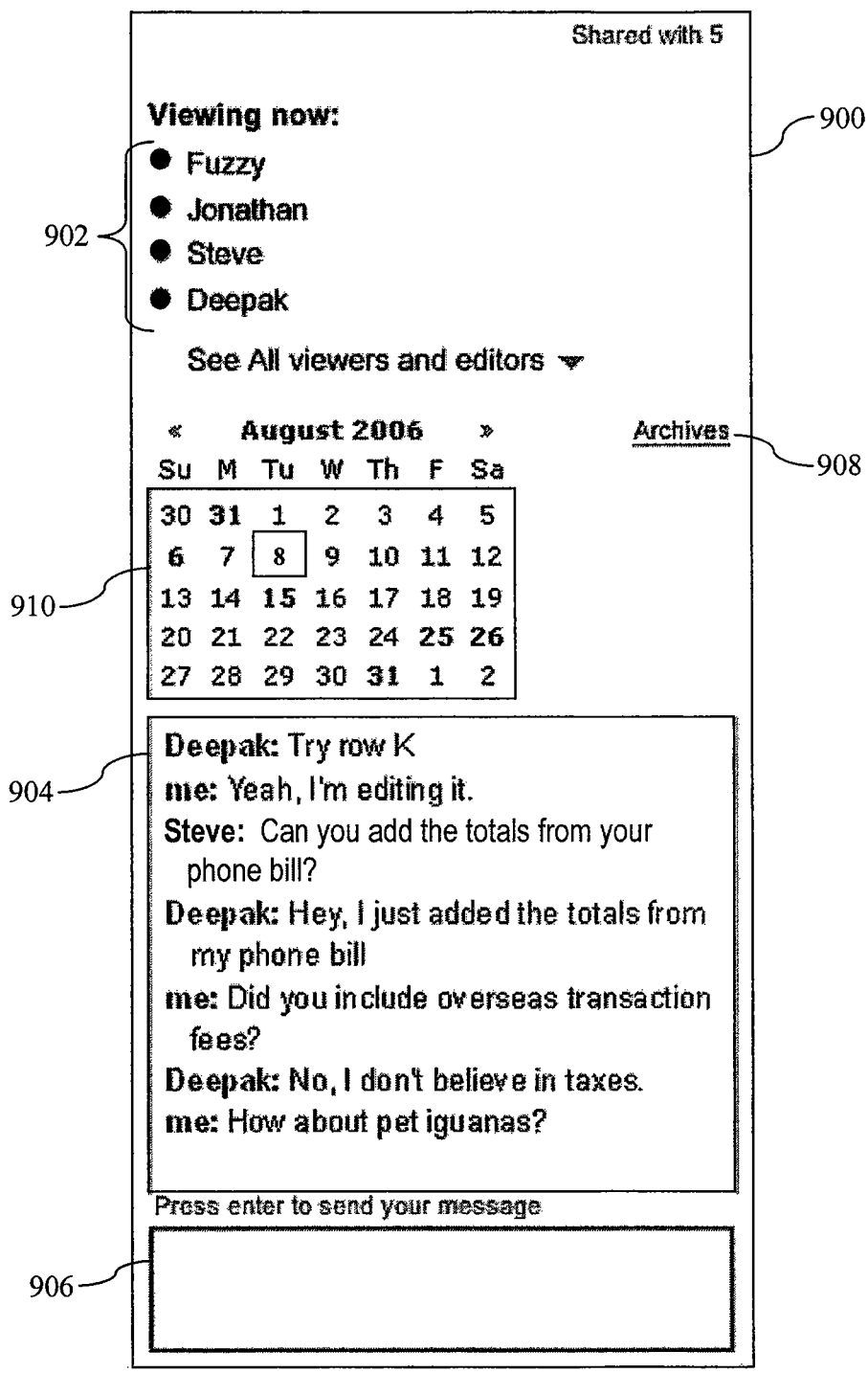
FIG. 9 is an illustration of still another exemplary live chat window according to an embodiment of the present invention.
Figure 10:
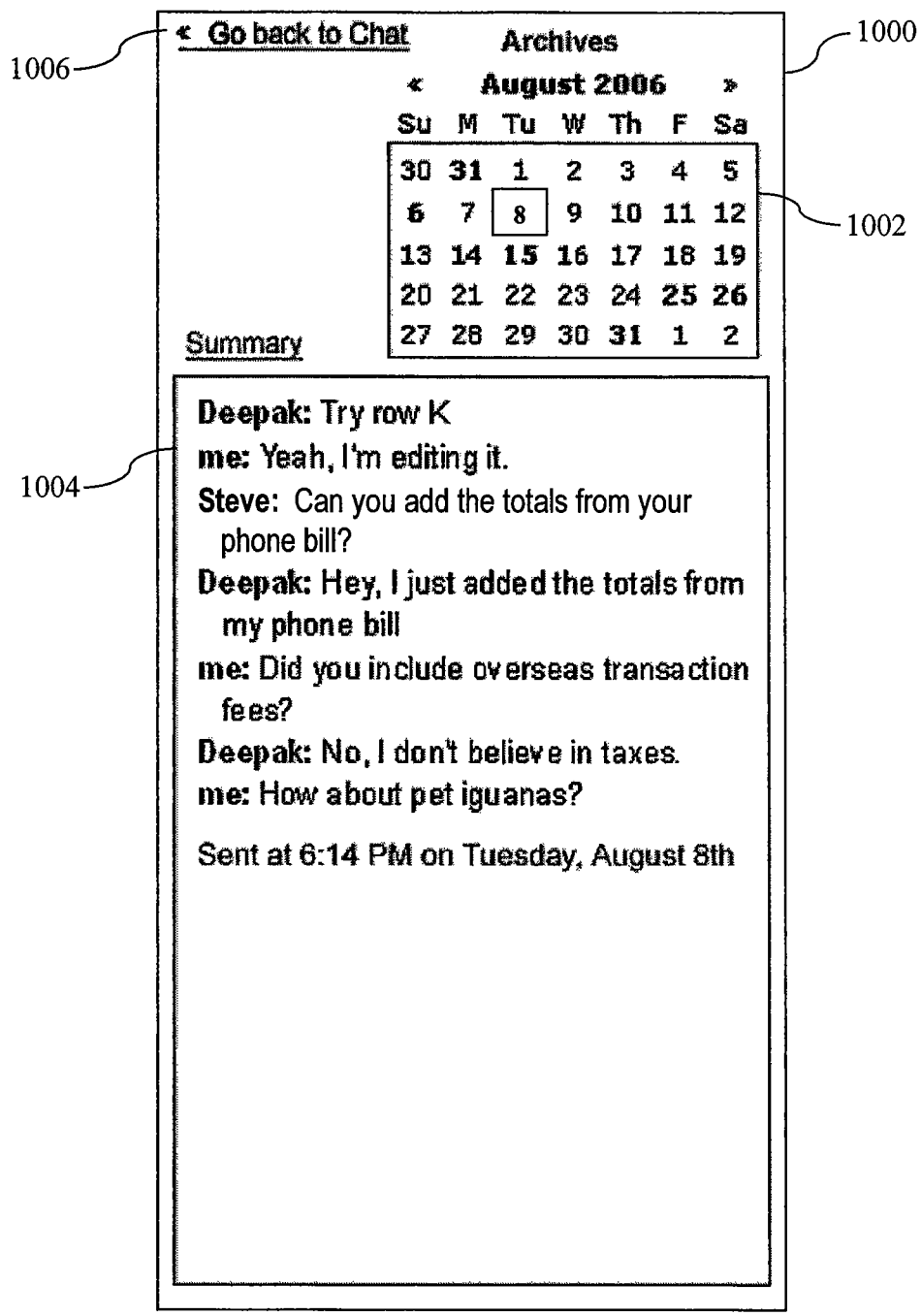
FIG. 10 is an illustration of an exemplary archived record window according to an embodiment of the present invention.

FIG. 9 is an illustration of an example live chat window 900. In addition to a participant indicator field 902, a message window 904, an input message field 906, and an archives link 908, live chat window 900 includes an archives calendar 910. Archives calendar 910 allows a user to search and/or filter archived records by date. In an embodiment, dates on which a live chat occurred involving the user are highlighted in archives calendar 910. This highlighting feature allows a user to quickly identify dates on which a live chat occurred, which simplifies the search process. When a user selects one of the dates indicated on archives calendar 910, one or more archived records corresponding to the selected date are displayed to the user, as illustrated in FIG. 10. In example system 100, selection of the selected date may be transmitted to filter 122 in archive manager 114 by IM server 104. Filter 122 may then access archive database 120, and pull one or more archived records from archive database 120 that correspond to one or more chats occurring on the selected date involving the requesting user. The one or more archived records may then be transmitted to the requesting user through IM server 104.

FIG. 10 is an illustration of an example archived record window 1000. Archived record window 1000 includes an archives calendar 1002 and an archived message window 1004. Archives calendar 1002 is similar to archives calendar 910. Instead of displaying messages associated with a live chat, archived message window 1004 displays messages associated with a previous chat occurring on the date selected in archives calendar 1002. Once the user is finished reviewing the archived record, the user can select a return to chat link 1006, which closes archived record window 1000 and returns the user to a live chat window. Alternatively, the user can review an archived record that occurred on a different date by selecting that date in archives calendar 1002.

Figure 11:
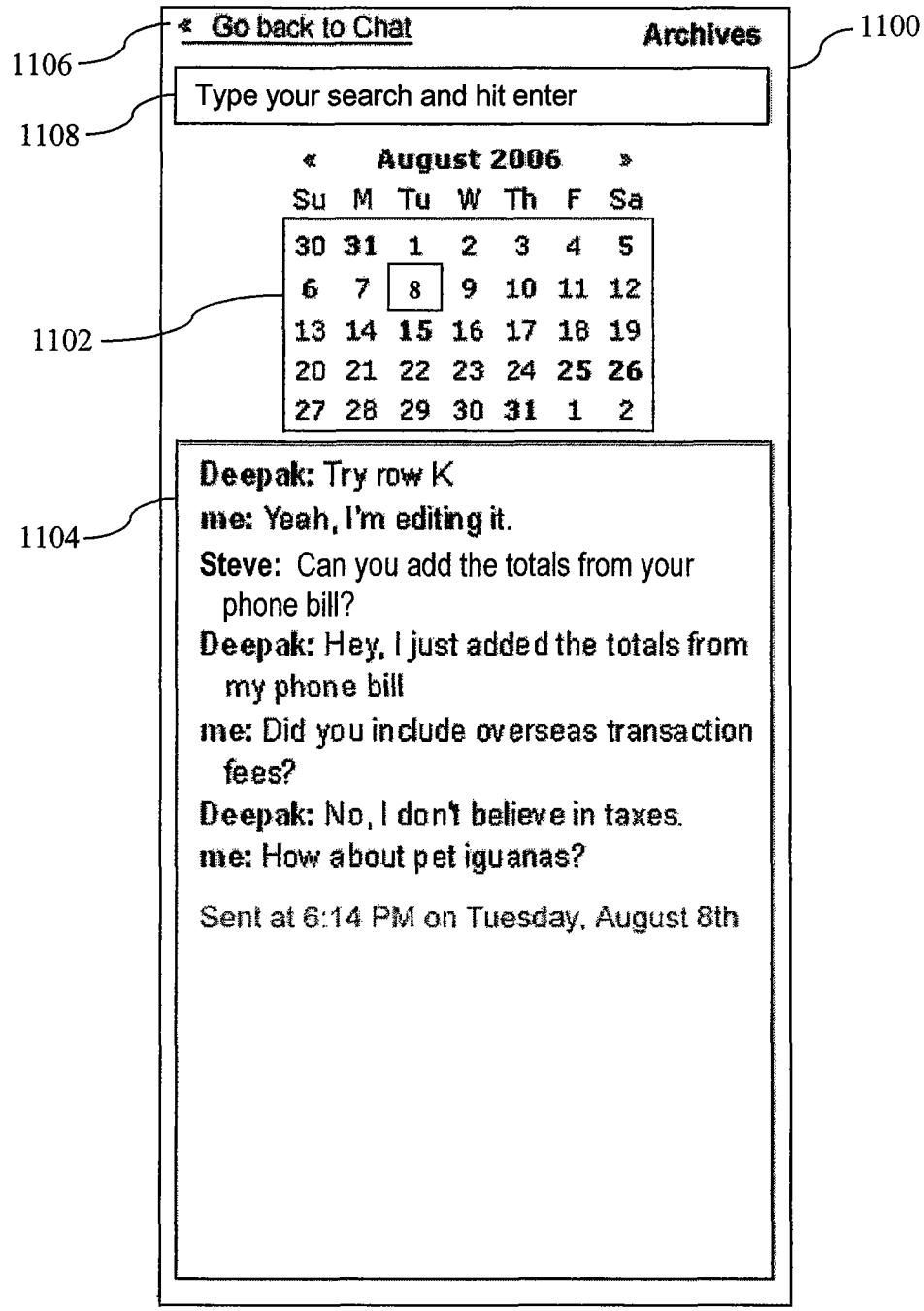
FIG. 11 is an illustration of another exemplary archived record window according to an embodiment of the present invention.

FIG. 11 is an illustration of an example archived record window 1100. In addition to archives calendar 1102, archived message window 1104, and return to chat link 1106, archived record window 1100 also includes a search field 1108. In this embodiment, once a date of interest has been selected by a user in archives calendar 1102, the user can enter one or more search terms in search field 1108 to further narrow the results returned in archived message window 1104. The search may be one or more of, for example and without limitation, a name of a participant involved in an archived chat or a keyword included in the text of an archived chat.

In example system 100, once a user enters a search term into search field 1108, the search term may be transmitted to filter 122 in archive manager 114 by IM server 104. Filter 122 may then access archive database 120, and pull one or more archived records from archive database 120 that correspond to one or more chats occurring on the selected date, involving the requesting user, which include the entered search term. The one or more archived records may then be transmitted to the requesting user through IM server 104.

Figure 12:
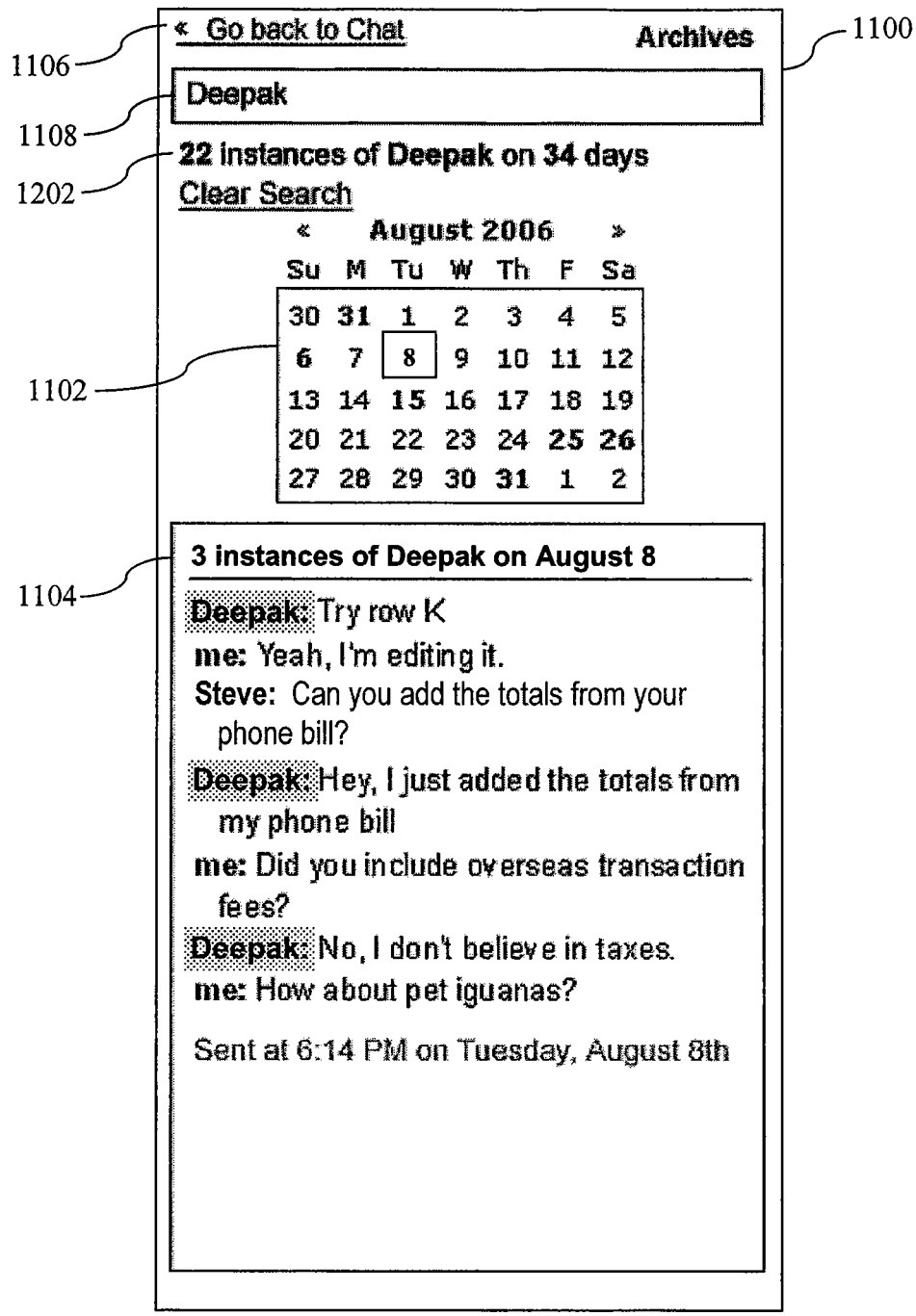
FIG. 12 is an illustration of an exemplary archive search result returned according to an embodiment of the present invention.

FIG. 12 is an illustration of an example search result returned in archived record window 1100. The search term entered by user "me" is the name of another participant in a previous chat, "Deepak", and archives calendar 1102 indicates that the date of interest is Aug. 8, 2006. As indicated in message window 1104, three instances of the term "Deepak" occurred on the date selected by user "me" on the date of interest. For ease of use by the user, instances of the search term may be highlighted in archived message window 1104. Archived record window 1100 may also include a search summary 1202. As illustrated in FIG. 12, search summary 1202 may indicate the total number of instances of the search term over a number of archived records.

Figure 13:
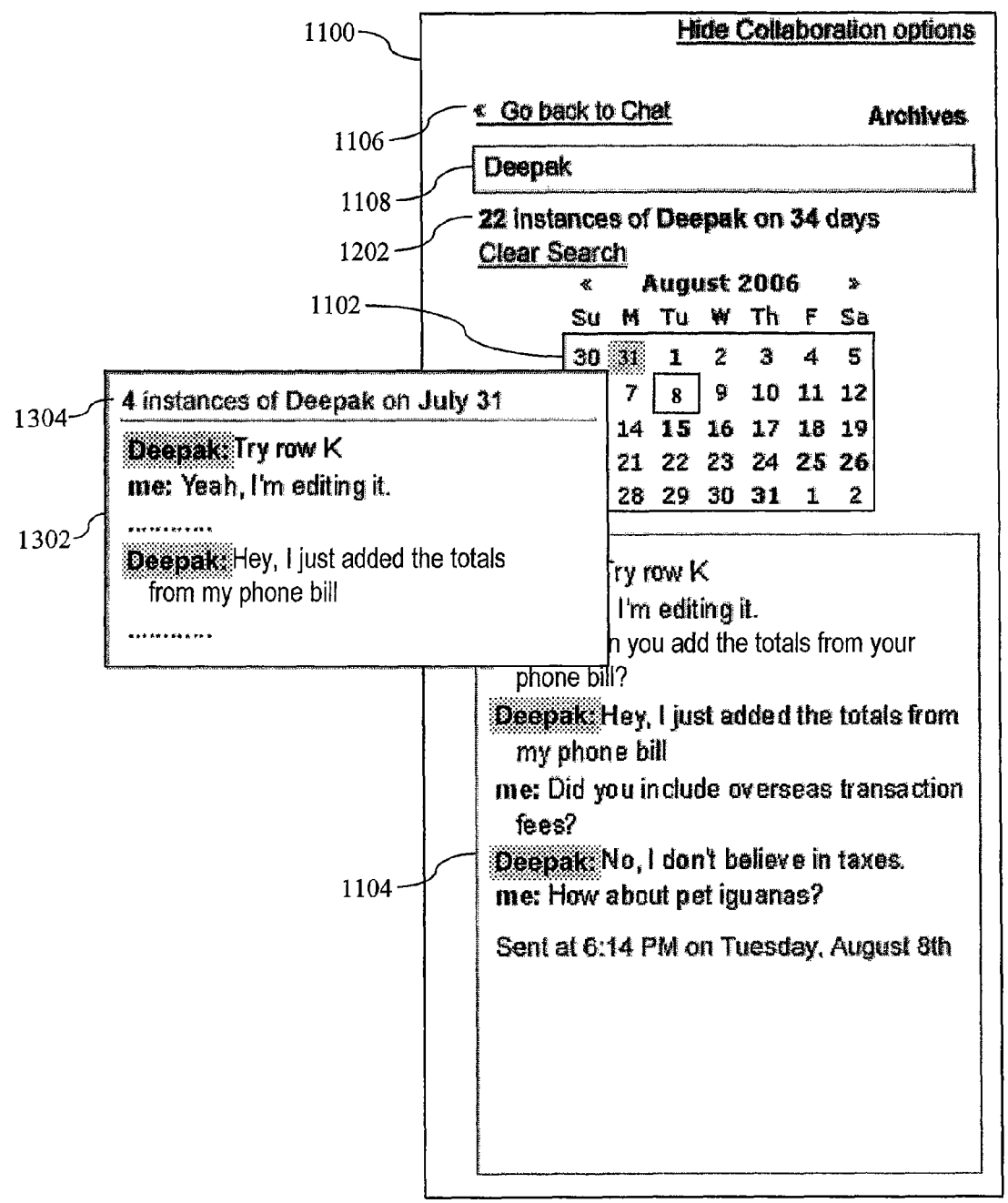
FIG. 13 is an illustration of another exemplary archive search result returned according to an embodiment of the present invention.

FIG. 13 is an illustration of an example search result returned using an archives calendar, such as archives calendar 1102 in archived record window 1100. In an embodiment, when a user hovers over a date on archives calendar 1102, a search result window 1302 opens. Search result window 1302 may include search results corresponding to the hovered-over date. Search result window 1302 may also include a search summary 1304. Since search result window 1302 corresponds to a particular date, search summary 1304 may summarize the results of the search for that particular date. Additionally, instances of the search term may be highlighted in search result window 1302. In the example of FIG. 13, the user has entered the term "Deepak" in search field 1108 and is hovering over the date Jul. 31, 2006, in archives calendar 1102. Search summary 1304 indicates that four instances of the search term occurred in chats on the date of interest. Search result window 1302 displays the search results with the search term instances highlighted.

Web Connection Services

Figure 14:
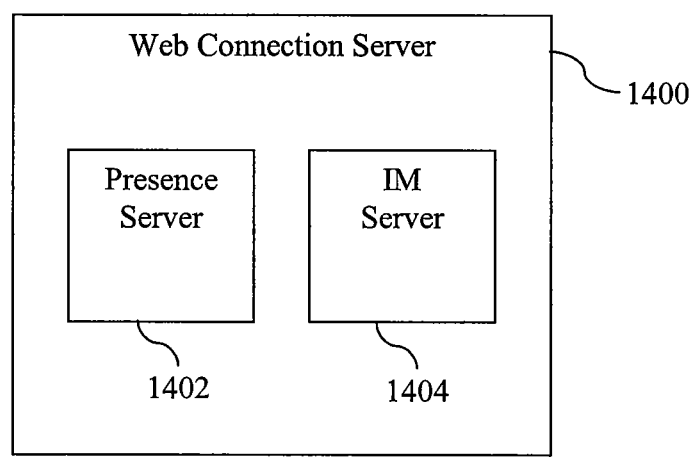
FIG. 14 is a diagram of a web connection server supporting IM with linked archiving, presence, and web connectivity according to an embodiment of the present invention.

According to a further embodiment, the present invention can also include web connectivity along with presence and instant messaging. FIG. 14 is a diagram of an example web connection server 1400 supporting IM with archiving, presence, and web connectivity according to another embodiment of the present invention. Web connection server 1400 can be used in place of IM server 104. Web connection server 1400 includes a presence server 1402 and an IM server 1404. Presence server 1402 manages presence to support instant messaging applications. IM server 1404 manages instant messaging between clients as described above with respect to IM server 104.

Example IM Client Implementation

Figure 15:
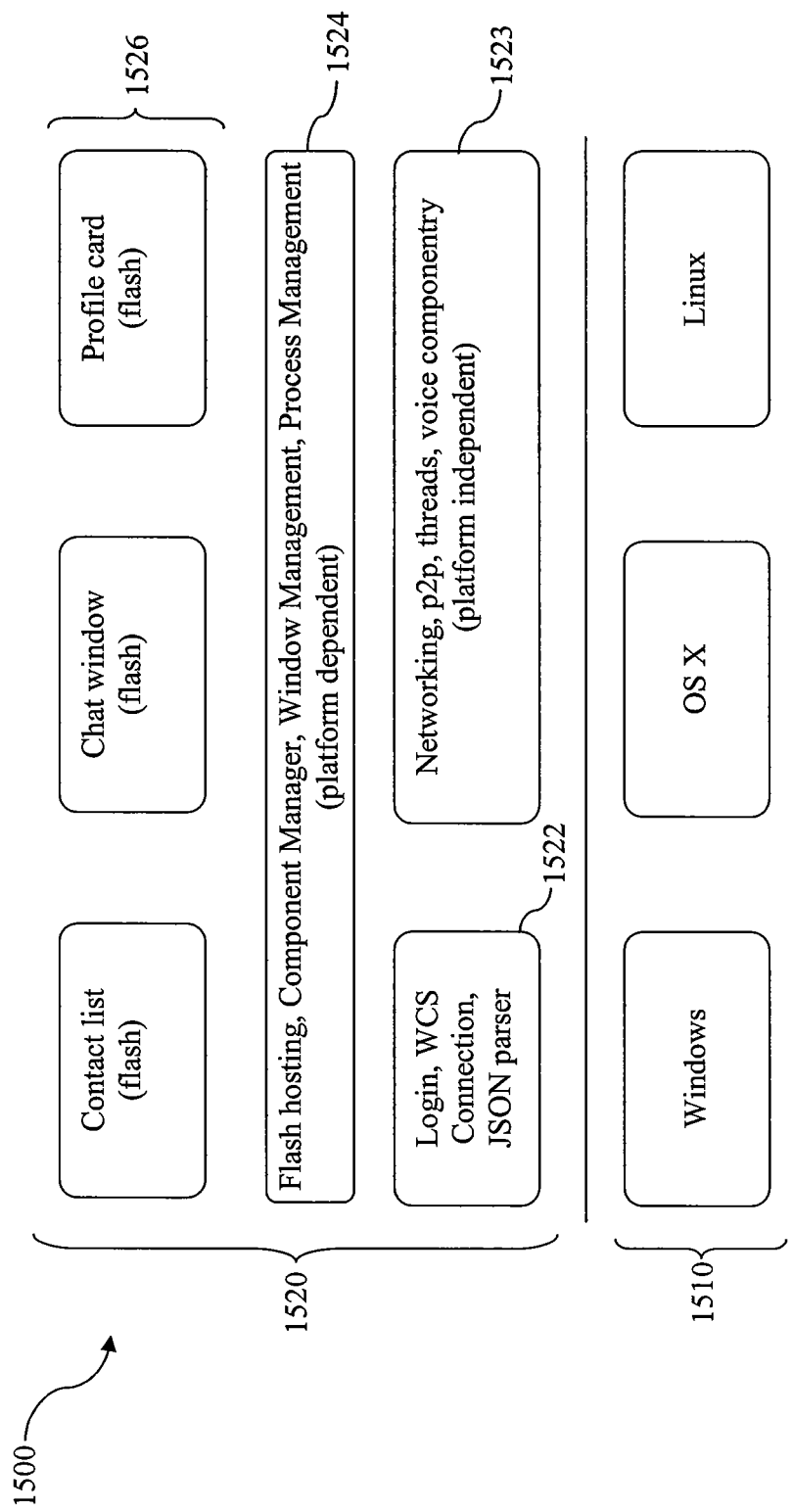
FIG. 15 is a diagram of an example IM client according to an embodiment of the present invention.

FIG. 15 is a diagram of an example IM client 1500 and its architecture according to another embodiment of the present invention. This example is illustrative and not intended to limit the present invention. IM client 1500 can support multiple platforms. IM client 1500 includes an operating system layer 1510 and a higher components layer 1520. Operating system layer 1510 can include any operating system, including but not limited to, Linux available from Red Hat, OS X available from Apple Corporation, or Microsoft Windows operating system. Higher components layer 1520 can include components for carrying out various IM client operations. In one example, web connectivity components 1522 can manage log-in, web connectivity, and parsing. Other components 1523 can support networking, peer-to-peer, threads, and voice operations. An IM client management layer 1524 supports FLASH hosting, component management, window management, and process management. A user interface layer 1526 supports a contact list, chat window, and profile card display. In one example, the user interface layer 1526 is implemented in Macromedia FLASH. IM client 1500 can run on any type of hardware including any type of processing device including, but not limited to, a computer, workstation, distributed computing system, embedded system, stand-alone electronic device, networked device, mobile device (such as a mobile phone), set-top box, television, game console, or other type of processor or computer system.

A cell renderer may be used in IM client 1500 to render each incoming message in a message window. This can support rendering of and interaction with messages. The cell renderer can include elements that are customizable. A motivation for using a cell renderer for each message is that some messages can be set apart. For example, offline messages could have a different background color to visually set them apart from new conversation messages. Another example of a cell renderer would be a file transfer progress indicator. In the file transfer case, the cell renderer may show progress of the file transfer in progress. Cell renderers may be especially helpful when showing shared content such as a photo or application specific messages that could trigger an action on the current page.

Different cell renderers can be used to support regular instant messaging. A special cell renderer may be used for messages containing emoticons. An emoticon is a string of punctuation in the form of a human face expressing an emotion. When an emoticon string is recognized, a graphical icon (such as of a smiling, frowning, or surprised face, for example) or other image can replace the emoticon in the message. Since FLASH text fields may have very limited support for in-lining images, however, the emoticons may have to be overlaid on top of the text.

Using cell renderers can create an implementation hurdle in a FLASH environment. Since each message is in a separate cell renderer element, selection across messages is not necessarily native to FLASH. In one implementation, since cell renderers may be FLASH objects implementing a specific application programming interface (API), cell renderers can be loaded externally. The advantage of doing so is that other properties can build cell renderers to be used for specific message types. For example, a photosharing application, such as, PicasaWeb available from Google, Inc., could provide a cell renderer for photos. If a PicasaWeb picture is sent via the client to a contact, the message window would download the cell renderer to display the PicasaWeb message for the contact. Similarly, a photo album viewer could be created for shared PicasaWeb photo albums, and a video viewer could be created for videos from a video sharing service, such as, Google Video available from Google, Inc., and/or other services.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method of enabling access to a multi-user chat archive, comprising:
   hosting an ad hoc computer network-based live chat having three or more participants, wherein said hosting comprises:
      receiving a request from a first participant to initiate a live chat with a second participant;
      determining state information corresponding to the live chat;
      establishing an instant messaging (IM) connection register having connection information associated with the first participant and the second participant;
      receiving a request from either the first participant or the second participant to invite a third participant to the existing live chat;
      updating the state information corresponding to the live chat; and
      adding connection information associated with the third participant to the established IM connection register;
   after the live chat between the three or more participants has started receiving from one of the participants a selection of one of the other participants from a participant indicator field;
   in response to the selection of one of the other participants from the participant indicator field, providing a sidebar window that allows the participant that provided the selection of one of the other participants and the other participant that was selected to engage in a two-user chat in addition to the live chat that includes three or more participants;
   archiving a record containing text from the live chat in a central location accessible by each of the participants;
   providing an archive calendar to a requesting participant during the live chat, wherein the archive calendar is displayed within a user interface of the live chat, and wherein the archive calendar enables selection of one or more dates in the archive calendar from the user interface of the live chat during the live chat, the selection enabling identification of a plurality of archived live chat records associated with one or more selected dates;
   receiving a selection of one or more dates in the archive calendar from the requesting participant;
   in response to the selection of the one or more dates in the archive calendar from the requesting participant, retrieving the plurality of archived live chat records associated with the selected one or more dates;
   retrieving at least the text of the plurality of the retrieved archived live chat records, the archived live chat records having the requesting participant as one of the three or more participants, wherein the requesting participant is any one of the three or more participants; and
   filtering the retrieved plurality of archived live chat records by at least a multimedia component included in the live chat.

2. The method of claim 1, further comprising:
   receiving a search term input by the requesting participant;
   identifying one or more archived records of the live chat as corresponding to the search term; and
   returning the one or more identified archived records to the requesting participant.

3. The method of claim 2, wherein the search term is at least one of a participant of the live chat or a keyword.

4. The method of claim 1, wherein archiving comprises indexing the record of the live chat by at least one of a participant of the live chat, a date of the live chat, or a keyword.

5. The method of claim 1, further comprising:
   filtering the archived record of the live chat by at least one of a participant of the live chat, a date of the live chat, or a keyword included in the live chat.

6. The method of claim 1, wherein said hosting further comprises:
   receiving a chat message from a first participant of the live chat; and
   distributing the chat message to at least a second participant of the live chat and a third participant of the live chat.

7. The method of claim 6, wherein:
   receiving a chat message from a first participant comprises receiving the chat message from a first instant messaging (IM) client associated with the first participant; and
   distributing the chat message comprises distributing the chat message to at least a second IM client associated with the second participant and a third IM client associated with the third participant.

8. The method of claim 1, wherein said hosting and said archiving occur substantially simultaneously.

9. The method of claim 1, wherein archiving a record of the live chat includes archiving a multimedia element associated with the live chat.

10. The method of claim 9, wherein the multimedia element is at least one of a video component of the live chat, an audio component of the live chat, a file transferred during the live chat, or a URL associated with the chat.

11. The method of claim 1, further comprising:
   displaying, to the requesting participant, a link to an archive database within a live chat window.

12. The method of claim 1, further comprising:
displaying, to the requesting participant, a link to an archive database of the live chat within a computer network-based electronic mail user interface.

13. The method of claim 1, further comprising:
opening a new computer network-based chat connection between two participants of the live chat when one participant requests a sidebar chat with another participant through a multi-user chat interface.

14. A system for enabling access to a multi-user chat archive, comprising:
a multi-user instant messaging (IM) server that receives a chat message from a first participant during an ad hoc live chat and distributes the chat message to at least a second participant and a third participant during the live chat,
wherein the IM server receives a request to invite a new participant to an existing chat session and connects the new participant to a computer network-based chat connection between existing participants using information from a connection manager;
a state manager that identifies the first, second, and third participants;
wherein after the live chat between the three or more participants has started, a selection is received from one of the participants of one of the other participants from a participant indicator field, and, in response to the selection of one of the other participants from the participant indicator field a sidebar window is provided by the multi-user IM server that allows the participant that provided the selection of one of the other participants and the other participant that was selected to engage in a two-user chat in addition to the live chat that includes three or more participants;
an archive database that stores an archived record containing text from the live chat in a central location, wherein the central location is accessible by each of the chat participants;
an archive calendar that enables selection of one or more dates by a requesting participant during the live chat, wherein the archive calendar is displayed within a user interface of the live chat during the live chat, the selection enabling identification of a plurality of archived live chat records associated with one or more selected dates, wherein the requesting participant is any one of the three or more participants; and
an archive manager that retrieves the plurality of the archived live chat records in response to a selection of the one or more dates in the archive calendar from the requesting participant, retrieves at least the text of the plurality of the retrieved archived live chat records, the archived live chat records having the requesting participant as one of the three or more participants, and filters the retrieved plurality of archived live chat records by at least a type of multimedia component included in the live chat.

15. The system of claim 14, wherein the archive manager comprises:
a filter that receives a search term input by a participant and returns one or more archived records of the live chat corresponding to the search term.

16. The system of claim 15, wherein the search term is at least one of a name of a participant of the live chat, or a keyword, included in the live chat.

17. The system of claim 14, further comprising:
a connection manager that manages information regarding connection information between each of the live chat participants and the IM server.

18. The system of claim 17, wherein the connection manager further manages information regarding connection information between respective remote client devices associated with each of the live chat participants and the IM server.

19. The system of claim 14, wherein the archive database further stores a multimedia record associated with the live chat.

20. The system of claim 19, wherein the multimedia records is at least one of a video component of the live chat, an audio component of the live chat, a file transferred during the live chat, or a URL associated with the live chat.

21. The system of claim 14, wherein the request from the participant of the live chat for the archived record is received via a link within a live chat window.

22. The system of claim 14, wherein the request from the participant of the live chat for the archived record is received via a link within a computer network-based electronic mail user interface.

* * * * *